(12) United States Patent
Oguni et al.

(10) Patent No.: US 7,271,212 B2
(45) Date of Patent: Sep. 18, 2007

(54) THERMOPLASTIC RESIN COMPOSITION AND SHAPED ARTICLE

(75) Inventors: Toshio Oguni, Osaka (JP); Hiroshi Sagane, Hyogo (JP)

(73) Assignee: Daicel Polymer, Ltd., Tokyo (JP)

( * ) Notice: Subject to any disclaimer, the term of this patent is extended or adjusted under 35 U.S.C. 154(b) by 429 days.

(21) Appl. No.: 10/896,282

(22) Filed: Jul. 22, 2004

(65) Prior Publication Data

US 2005/0032961 A1    Feb. 10, 2005

(30) Foreign Application Priority Data

Aug. 7, 2003    (JP) .............................. 2003-289190

(51) Int. Cl.
   *C08L 51/00*    (2006.01)
(52) U.S. Cl. ...................... 524/442; 524/504
(58) Field of Classification Search ................ 524/442, 524/443, 445, 456; 525/78, 221, 329.7
   See application file for complete search history.

(56) References Cited

U.S. PATENT DOCUMENTS

| | | | | |
|---|---|---|---|---|
| 3,318,972 | A * | 5/1967 | Mcrtzweiller et al. | 525/286 |
| 3,846,637 | A * | 11/1974 | Burton | 524/456 |
| 4,722,959 | A * | 2/1988 | Inoue et al. | 524/412 |
| 5,496,878 | A * | 3/1996 | Goetz et al. | 524/275 |
| 6,469,095 | B1 * | 10/2002 | Gareiss et al. | 524/504 |
| 6,780,917 | B2 * | 8/2004 | Hashimoto et al. | 524/456 |
| 6,812,166 | B2 * | 11/2004 | Vathauer et al. | 438/800 |

FOREIGN PATENT DOCUMENTS

| | | |
|---|---|---|
| JP | 7-90118 A | 4/1994 |
| JP | 7-149948 A | 6/1995 |
| JP | 9-12846 A | 1/1997 |
| JP | 10-60251 A | 3/1998 |
| JP | 2777690 B2 | 5/1998 |
| JP | 10-324789 A | 12/1998 |
| JP | 2001-181497 A | 7/2001 |
| JP | 3265314 B2 | 12/2001 |
| JP | 2002-265769 A | 9/2002 |

* cited by examiner

*Primary Examiner*—Katarzyna Wyrozebski
(74) *Attorney, Agent, or Firm*—Birch, Stewart, Kolasch & Birch, LLP

(57) ABSTRACT

A resin composition comprises 1 to 60 parts by weight of a wollastonite fiber (in which the number-average fiber length is 1 to 30 μm, the number-average fiber diameter is 0.1 to 10 μm, and the proportion of the number of a fiber having a fiber length of 5 to 25 μm relative to the total number of the fiber is 20 to 75%) and 0.1 to 20 parts by weight of an acid- or epoxy-modified olefinic resin having a melting point of 100 to 170° C., relative to 100 parts by weight of a thermoplastic resin (e.g., a polycarbonate-series resin). The weight-average molecular weight of the modified olefinic resin may be about $2.5 \times 10^4$ to $30 \times 10^4$. The resin composition may comprise a flame retardant. The combination use of the wollastonite fiber and the modified olefinic resin improves heat resistance, impact resistance and weld strength, even in the case of using a wollastonite fiber having a number-average fiber diameter of about 4 to 7 μm and an average aspect ratio of about 1.5 to 3. The present invention provides a thermoplastic resin composition for improving the impact resistance, weld strength and surface property without deteriorating the heat resistance.

14 Claims, No Drawings

THERMOPLASTIC RESIN COMPOSITION AND SHAPED ARTICLE

This Non-provisional application claims priority under 35 U.S.C. § 119(a) on Patent Application No(s). 2003-289190 filed in Japan on Aug. 7, 2003, the entire contents of which are hereby incorporated by reference.

FIELD OF THE INVENTION

The present invention relates to a thermoplastic resin composition (e.g., a flame-retardant resin composition) obtained from a thermoplastic resin (such as a polycarbonate-series resin) as a base resin, and a shaped article using the resin composition.

BACKGROUND OF THE INVENTION

Through the use of formability in thermoplastic resins, various shaped articles have been manufactured. In particular, to impart a high rigidity, a high impact resistance, or a high heat resistance to such a shaped article, it has been proposed that a fibrous filler (e.g., glass fiber) or a scale-like or plate-like inorganic filler (e.g., a talc, and a mica) is added to a thermoplastic resin (e.g., an aromatic polycarbonate resin). In the case of using the fibrous filler, however, the fiber prominence is exhibited in the shaping (or molding) process, and the transferring property to metal mold and the external appearance of the shaped article are deteriorated. Moreover, anisotropy of the fibrous filler tends to cause warps in the shaped article, also deteriorates flowability, and therefore, it is difficult to improve shaping processability (moldability). On the other hand, in the case of reinforcing the shaped article with the scale-like or plate-like inorganic filler, the appearance property (the external appearance) can be improved, however, the reinforcing property is not high. In order to improve rigidity, therefore, it is necessary to use a large amount of the filler. Further, in the case of using these fillers, a strength of weld obtained by merge (or join) of a molten resin composition is low. Accordingly, shaped articles not only being excellent in rigidity, an appearance property, and dimensional stability, but also having high weld strength have been desired.

Japanese Patent Publication No. 2777690 discloses a resin composition which comprises a thermoplastic resin and a wollastonite fiber containing $Fe_2O_3$ of 0.2 to 0.5% by weight and $Al_2O_3$ of 0.5 to 0.9% by weight as minor constituents; and a resin composition in which the average fiber length of the wollastonite fiber is 20 to 50 µm, the average fiber diameter thereof is 0.05 to 5 µm, and the average aspect ratio thereof is not less than 8 and less than 100. In this document, it is described that a wollastonite fiber without the above properties deteriorates in reinforcing property, or is frangible in kneading with a resin, and that the use of such a resin composition ensures a shaped article having high strength and high elastic modulus and being excellent in surface smoothness and dimensional accuracy.

In this resin composition, however, a usable wollastonite is limited to a specific wollastonite. Further, because the average fiber length of the wollastonite fiber is long, the wollastonite fiber is frangible in kneading with a resin, and cannot impart high reinforcing property to the composition in some cases. Furthermore, even when the wollastonite fiber can reinforce the resin, the composition tends to deteriorate in the weld strength.

Japanese Patent Publication No. 265314 discloses a thermoplastic molding composition which is a mixture of a thermoplastic resin (e.g., a polyalkylene terephthalate, and an aromatic polycarbonate) and an inorganic additive, wherein the inorganic additive is calcium metasilicate in the form of a needle-like fine particle, has a number-average length of 1 to 50 µm and a number-average diameter of 0.1 to 10 µm, and at least 50% thereof are 5 to 25 µm long, and the proportion of the thermoplastic resin relative to the fine particulate inorganic additive is 95/5 to 30/70 (% by weight). This document mentions that the number-average aspect ratio (length/diameter) of the fine-particulate additive is not less than 6, or is in a range of less than 1 to about 10. This document also mentions that the resin composition satisfies properties such as a coated external appearance having high sharpness, or a low coefficient of linear expansion.

However, since the proportion of the fiber having a fiber length of 5 to 25 µm is not less than 50%, it is necessary to use a wollastonite fiber having a sharp (or narrow) distribution in fiber length, and a wide range of a wollastonite fiber cannot be used. Further, as well as the above-cited Japanese Patent Publication No. 2777690, while the addition of the wollastonite fiber imparts reinforced property to a resin, the addition is apt to deteriorate the weld strength. Furthermore, compared with a fibrous filler such as a glass fiber, such a wollastonite fiber can improve the surface appearance of the shaped article, however, the appearance defect of the shaped article occurs to no small extent.

Japanese Patent Application Laid-Open No. 12846/1997 (JP-9-12846A) discloses a resin composition comprising an aromatic polycarbonate resin, an aromatic polyester resin, and a wollastonite having an aspect ratio of 3 to 50, and if necessary an olefinic wax containing a carboxyl group and/or an acid anhydride group. Japanese Patent Application Laid-Open No. 60251/1998 (JP-10-60251A) discloses a blow-moldable resin composition comprising an aromatic polycarbonate resin, an aromatic polyester resin, and a wollastonite having an aspect ratio of 3 to 50, and an olefinic wax containing a carboxyl group and/or an acid anhydride group. Japanese Patent Application Laid-Open No. 324789/1998 (JP-10-324789A) discloses a blow-moldable resin composition comprising an aromatic polycarbonate resin, a graft copolymer (e.g., an ABS resin), a wollastonite having an aspect ratio of 3 to 50, and an olefinic wax containing a carboxyl group and/or an acid anhydride group. These documents also mention that the amount of the olefinic wax is 0 to 7 parts by weight (particular 0.02 to 5 parts by weight) relative to 100 parts by weight of the resin composition.

Japanese Patent Application Laid-Open No. 181497/2001 (JP-2001-181497A) discloses a resin composition which comprises an aromatic polycarbonate-series resin, a thermoplastic aromatic polyester-series polymer, a wollastonite having an aspect ratio (L/D) of 3 to 50, and an olefinic wax having a carboxyl group and/or an acid anhydride group, wherein the proportion of the wollastonite and that of the olefinic wax are 1 to 100 parts by weight and 0.02 to 5 parts by weight, respectively, relative to 100 parts by weight of a mixed resin containing 90 to 50 parts by weight of the aromatic polycarbonate-series resin and 10 to 50% by weight of the thermoplastic aromatic polyester-series polymer.

Further, Japanese Patent Application Laid-Open No. 265769/2002 (JP-2002-265769A) discloses an aromatic polycarbonate resin composition which comprises 100 parts by weight of a resin component containing (1) 50 to 100% by weight of an aromatic polycarbonate resin (A), and (2) 0 to 50% by weight of at least one thermoplastic resin (B) selected from a thermoplastic polyester-series resin (B-1), and a styrene unit-containing resin (B-2) in which the content of the rubber component is less than 40% by weight; and (3) 1 to 100 parts by weight of a wollastonite particle (C) which has such properties of a particle form that a number-average fiber length is not less than 10 μm, a number-average fiber diameter is not less than 4 μm, and a number proportion of a particle having a fiber length of 5 to 25 μm is less than 50%. The document mentions that the resin composition has a high rigidity, a high impact resistance, an excellent surface appearance, and an excellent recycling efficiency. Further, the document mentions a resin composition containing 0.02 to 5 parts by weight of a breaking inhibitor for the wollastonite particle (E) relative to 100 parts by weight of the aromatic polycarbonate resin (A) or resin component, and an olefin wax, as the breaking inhibitor, having a functional group (e.g., carboxyl group, acid anhydride group, and epoxy group) having a reactivity or affinity to the wollastonite particle, and also describes that the weight-average molecular weight of such an olefin wax is 1000 to 20000. In addition, a resin composition containing a flame retardant is disclosed in the document.

In these resin compositions, however, the olefinic wax deteriorates the heat deformation temperature of the compositions, and reduces the heat resistance thereof. Therefore, such compositions seem in no way compatible with thinning and weight saving and improvements of heat resistance, which is required for a recent information equipment (e.g., an information terminal equipment, or an office automation equipment). Moreover, a wollastonite fiber having a short fiber length can improve an appearance property of a shaped article, but deteriorates rigidity of the shaped article, as the above filler. Further, as the number-average fiber diameter of the wollastonite fiber gets larger, the surface property (or surface smoothness) of the shaped article is deteriorated. Thus, usable wollastonite fibers are limited to a specific one.

SUMMARY OF THE INVENTION

It is therefore an object of the present invention to provide a thermoplastic resin composition for improving the impact resistance, weld strength and surface property without deteriorating the heat resistance, and a shaped article formed from the same.

It is another object of the present invention to provide a thermoplastic resin composition for remarkably improving the rigidity, impact resistance, heat resistance and weld strength even in the case of using various wollastonite fibers, and a shaped article formed from the same.

It is still another object of the present invention to provide a thermoplastic resin composition having an improved heat stability, flowability and shaping processability (mold-processability), and having a high flame retardancy, and a shaped article formed from the same.

The inventors of the present invention made intensive studies to achieve the objects mentioned above, and finally found that the combination use of a wollastonite and a specific olefinic resin having a high molecular weight improves rigidity, impact resistance, weld strength and surface property of a thermoplastic resin without deteriorating the heat resistance of the thermoplastic resin independently of species of the wollastonite fiber. The present invention was accomplished based on the above finding.

That is, the thermoplastic resin composition of the present invention comprises a thermoplastic resin, a wollastonite fiber, and an acid- or epoxy-modified (acid group- or epoxy group-containing, or acid group- or epoxy group-incorporated) olefinic resin. The thermoplastic resin may comprise, for example, at least one member selected from the group consisting of a polycarbonate-series resin, a polyester-series resin, a polyamide-series resin, and a styrenic resin. The thermoplastic resin comprises at least a polycarbonate-series resin in many cases. For example, the thermoplastic resin may comprise a polycarbonate-series resin and at least one member selected from the group consisting of a styrenic resin, a rubber-reinforced styrenic resin (a styrenic resin in which at least a styrenic monomer is graft-polymerized to a rubber component) and an aromatic polyester-series resin in a proportion of 1/99 to 100/0 (weight ratio). The wollastonite fiber may have, for example, a number-average fiber length of 1 to 30 μm (e.g., 1 to 20 μm) and a number-average fiber diameter of 0.1 to 10 μm (e.g., 0.1 to 7 μm), and the number of a wollastonite fiber having a fiber length of 5 to 25 μm may occupy 20 to 75% relative to the total number of the wollastonite fiber. In the present invention, since the modified olefinic resin having a high melting point is used, the properties of the resin composition can be significantly improved independently of the kind of the wollastonite fiber. For example, even when the fiber having a large fiber diameter and a small aspect ratio [for example, a fiber having an average fiber diameter of about 4 to 10 μm (e.g., about 4 to 7 μm) and an average aspect ratio of about 1.5 to 5 (e.g., about 1.5 to 3)] is used, heat resistance, impact resistance and weld strength can be improved. The melting point of the acid- or epoxy-modified olefinic resin may be about 100 to 170° C. The acid- or epoxy-modified olefinic resin usually has a high melting point and a high molecular weight, and for example, the weight-average molecular weight is about $2.5 \times 10^4$ to $30 \times 10^4$ (e.g., about $2.5 \times 10^4$ to $25 \times 10^4$).

Such a thermoplastic resin composition may comprise, for example, 1 to 60 parts by weight of the wollastonite fiber, and 0.1 to 20 parts by weight of the acid- or epoxy-modified olefinic resin having a weight-average molecular weight of $2.5 \times 10^4$ to $25 \times 10^4$ and a melting point of 120 to 170° C., relative to 100 parts by weight of the thermoplastic resin, wherein the ratio of the wollastonite fiber relative to the acid- or epoxy-modified olefinic resin may be 99.5/0.5 to 50/50 (weight ratio). The wollastonite fiber may have a number-average fiber diameter of 4.1 to 8 μm (e.g., 4.1 to 7 μm) and an average aspect ratio of 1.5 to 2.8, and the proportion of the number of a wollastonite fiber having a fiber length of 5 to 25 μm relative to the total number of the wollastonite fiber may be not more than 50%.

The thermoplastic resin composition of the present invention may further comprise a flame retardant. The flame retardant may comprise, for example, an aromatic phosphoric ester-series flame retardant, and a fluororesin.

The present invention includes a shaped article formed from the resin composition, and a method for improving heat resistance and weld strength of a shaped article, which comprises molding a thermoplastic resin with a combination of a wollastonite fiber, and an acid- or epoxy-modified polyolefinic resin.

A thermoplastic resin molded with a combination of the wollastonite fiber and the acid- or epoxy-modified polyolefinic resin as components can be improved in the heat resistance and weld strength. That is, in the present invention, since a wollastonite fiber and an acid- and/or epoxy-modified polymeric olefinic resin (modifier) having a high melting point are used in combination, the thermoplastic resin can be improved in the flowability and formability without being deteriorated in the heat resistance depending on the amount of the modified olefinic resin to be added. Moreover, probably because the thermoplastic resin and the polymeric modified polyolefinic resin are bonded to or contact with the wollastonite, the resin composition of the present invention can be dramatically improved in the impact strength, as well as is also increased in the strength of the weld part. Further, probably because the modified olefinic resin modifies the surface of the wollastonite to improve in adhesiveness to the wollastonite, the surface property of the shaped article (e.g., surface appearance) can be improved. Therefore, requirements for a recent information equipment (e.g., thinning and weight saving, and improvement in heat resistance) can be filled.

According to the present invention, since a wollastonite fiber and a specific modified olefinic resin having a high molecular weight are used in combination, the resin composition improves in impact resistance, weld strength, and surface property without deteriorating heat resistance of the resin composition. Moreover, even in the case of using various wollastonite fibers (e.g., a fiber with a large fiber diameter and a small aspect ratio), the resin composition significantly improves in rigidity, impact resistance, heat resistance, and weld strength. Further, the heat stability, flowability, and shaping processability (mold-processability) are also increased. Furthermore, the resin composition improves in flame retardancy by using a flame retardant in combination with the wollastonite and the modified olefinic resin.

DETAILED DESCRIPTION OF THE INVENTION

[Thermoplastic Resin]

The present invention is applicable for various thermoplastic resins (or base resins) (in particular, a molding resin for injection molding or others). Such a resin includes an olefinic resin (e.g., a polyethylene-series resin, a polypropylene-series resin, an ionomer, and a methylpentene-series resin), a vinyl alcohol-series resin (e.g., a polyvinyl alcohol, and a polyvinylacetal), a styrenic resin, an acrylic resin [e.g., a poly(methyl methacrylate), a methyl methacrylate-styrene copolymer (a MS resin), and a methyl methacrylate-acrylate copolymer], a halogen-containing resin (e.g., a polyvinyl chloride resin, a vinyl chloride-vinyl acetate copolymer, and a fluororesin), a polycarbonate-series resin (an aromatic polycarbonate-series resin), a polyester-series resin (an aromatic polyester-series resin), a polyamide-series resin, a polyacetal-series resin, a polyphenylene ether-series resin, a polyphenylene sulfide-series resin, a polysulfone-series resin, a polyether sulfone-series resin, a polyether imide-series resin, a polyether ether ketone-series resin, a thermoplastic elastomer (e.g., a styrenic, an olefinic, a polyester-series, and a polyamide-series elastomer), and others. These thermoplastic resins may be used singly or in combination, or may form a polymer blend or a polymer alloy.

The preferred thermoplastic resin includes a polycarbonate-series resin (an aromatic polycarbonate-series resin), a styrenic resin, a polyester-series resin (an aromatic polyester-series resin), a polyamide-series resin, and others.

[Polycarbonate-series Resin]

The aromatic polycarbonate-series resin may be obtained by allowing a dihydric phenol compound to react with a carbonate precursor [e.g., a carbonylhalide (such as phosgene), a carbonyl ester (such as diphenyl carbonate), or a haloformate (such as a dihaloformate of a dihydric phenol compound)] by a conventional manner (e.g., an interfacial polycondensation method, and a transesterification method).

The dihydric phenol compound includes a bisphenol compound, for example, 4,4'-dihydroxydiphenyl; a bis(hydroxyphenyl)alkane, e.g., a bis(4-hydroxyphenyl)$C_{1-6}$alkane such as bis(4-hydroxyphenyl)methane, 1,1-bis(4-hydroxyphenyl)ethane, 2,2-bis(4-hydroxyphenyl)propane (bisphenol A), 2,2-bis(4-hydroxy-3-methylphenyl)propane, 2,2-bis(4-hydroxy-3,5-dimethylphenyl)propane, 2,2-bis(4-hydroxyphenyl)butane, and 2,2-bis(4-hydroxyphenyl)-3,3-dimethylbutane; a bis(hydroxyphenyl)cycloalkane, e.g., a bis(4-hydroxyphenyl)$C_{5-8}$cycloalkane such as 1,1-bis(4-hydroxyphenyl)cyclohexane, and 1,1-bis(4-hydroxyphenyl)-3,3,5-trimethylcyclohexane; a 9,9-bis(hydroxyphenyl)fluorene; a bis(hydroxyphenyl)alkylbenzene, e.g., a bis{(4-hydroxyphenyl)alkyl}benzene such as 1,3-bis{2-(4-hydroxyphenyl)propyl}benzene, and 1,4-bis{2-(4-hydroxyphenyl)propyl}benzene; 4,4'-dihydroxydiphenyl ketone, 4,4'-dihydroxydiphenyl ether, 4,4'-dihydroxydiphenyl sulfone, 4,4'-dihydroxydiphenyl sulfoxide, 4,4'-dihydroxydiphenyl ester, and others. These dihydric phenol compounds may be used singly or in combination.

As the dihydric phenol, a bis(4-hydroxyphenyl)alkane (e.g., bisphenol A), a bis(4-hydroxyphenyl)$C_{5-8}$cycloalkane, and others are usually employed.

The polycarbonate-series resin may have a linear structure or a branched structure. Incidentally, if necessary, the branched structure may be formed with the use of a small amount of a polyphenol having tri- or more functional groups, for example, a tris(hydroxyphenyl)alkane [e.g., 1,1,1-tris(4-hydroxyphenyl)ethane, and 1,1,1-tris(3,5-dimethyl-4-hydroxyphenyl)ethane]. Moreover, the polycarbonate-series resin may have a hydroxyl group in a terminal of the molecule, and the terminal may be blocked. The terminal may be blocked with a monofunctional phenol compound (e.g., phenol, and a $C_{1-20}$alkylphenol).

The molecular weight of the polycarbonate-series resin may be usually about $1\times10^4$ to $10\times10^4$ and preferably about $1\times10^4$ to $5\times10^4$ (e.g., about $1.5\times10^4$ to $3\times10^4$), as viscosity-average molecular weight. The viscosity-average molecular weight may be measured with the use of methylene chloride.

[Styrenic Resin]

The styrenic resin includes a non-rubber-reinforced (or rubber-free) styrenic resin, a rubber-reinforced styrenic resin (e.g., a styrenic graft resin in which at least a styrenic monomer is graft-polymerized to a rubber component, or rubber-grafted styrenic resin).

The styrenic monomer of the styrenic resin includes styrene, α-methylstyrene, a vinyltoluene (o-, m- or p-methylstyrene), a vinylxylene, an ethylstyrene, p-t-butylstyrene, a vinylnaphthalene, a halostyrene (e.g., monobromostyrene, dibromostyrene), and others. These styrenic monomers may be used singly or in combination. Among these styrenic monomers, styrene, α-methylstyrene, and a vinyltoluene are often used, and in particular, at least styrene is used in many cases.

The styrenic monomer may be used in combination with a copolymerizable monomer. Examples of the copolymerizable monomer include a vinyl cyanide (e.g., (meth)acrylonitrile), a (meth)acrylic monomer [e.g., a $C_{1-18}$alkyl ester of (meth)acrylic acid such as methyl methacrylate, ethyl acrylate, and ethyl methacrylate; a hydroxyalkyl ester of (meth)acrylic acid such as hydroxyethyl (meth)acrylate; glycidyl (meth)acrylate; an aryl (meth)acrylate such as phenyl acrylate; a cycloalkyl (meth)acrylate such as cyclohexyl acrylate; and an aralkyl (meth)acrylate such as benzyl methacrylate], a maleimide-series monomer [e.g., maleimide, N-methylmaleimide, and N-phenylmaleimide], and an α,β-unsaturated carboxylic acid [e.g., (meth)acrylic acid, maleic acid, maleic anhydride, phthalic acid, and itaconic acid]. These copolymerizable monomers may be also used singly or in combination.

As the non-rubber-reinforced styrenic resin, there may be exemplified a polystyrene, an acrylonitrile-styrene copolymer (AS resin), a copolymer of styrene and (meth)acrylic acid monomer (e.g., a styrene-(meth)acrylic acid copolymer, a styrene-methyl methacrylate copolymer (MS resin), and a methyl methacrylate-acrylonitrile-styrene copolymer (MAS resin)), and a styrene-maleic anhydride copolymer (SMA resin).

The rubber-reinforced styrenic resin may be obtained by a conventional manner, for example, by a graft polymerization of at least a styrenic monomer in the presence of a rubber component by a conventional method (e.g., mass polymerization, suspension polymerization, solution polymerization, and emulsion polymerization). In the rubber-reinforced styrenic resin, examples of the rubber component include various rubbers such as a diene-series rubber (e.g., a polybutadiene, a polyisoprene, a butadiene-isoprene copolymer, and a random or block styrene-butadiene copolymer), an ethylene-α-olefin copolymer rubber (e.g., an ethylene-propylene rubber, an ethylene-butene rubber), an ethylene-propylene-diene rubber, an ethylene-acrylate copolymer rubber (e.g., an ethylene-ethyl acrylate rubber, and an ethylene-butyl acrylate rubber), an ethylene-vinyl acetate copolymer, an acrylic rubber (e.g., a poly(butyl acrylate)), a silicone rubber, and a composite rubber. In the rubber-reinforced styrenic resin, the above-mentioned monomer is usable as the copolymerizable monomer, and usually, at least one member selected from the group consisting of acrylonitrile and methyl methacrylate is used in practical cases.

The rubber-reinforced styrenic resin includes, for example; a high impact-resistant polystyrene (HIPS resin) in which a styrenic monomer is graft-polymerized to a rubber component, a polymer in which acrylonitrile (A) and/or methyl methacrylate (M) and styrenic monomer (S) are graft-polymerized to a rubber component [e.g., an ABS resin, a MBS resin and a MABS resin, each containing a butadiene rubber as a rubber component; an ASA resin containing an acrylic rubber as a rubber component; an AES resin containing an ethylene-propylene rubber as a rubber component], or a hydrogenated product thereof. These rubber-reinforced styrenic resins may be used singly or in combination.

In the rubber-reinforced styrenic resin, the content of the rubber component is, for example, not more than 40% by weight (e.g., about 2 to 30% by weight), preferably about 5 to 25% by weight, and particularly about 5 to 20% by weight.

The rubber-reinforced styrenic resin usually comprises a matrix of a styrenic resin, and a rubber component dispersed in the form of particles in the matrix. The form of the rubber component dispersed in the matrix is not particularly limited to a specific one, and may comprise a core/shell structure, an onion structure, a salami structure, and other structure. The particle size of the rubber component constituting a dispersed phase may be selected depending on applications of the resin composition. For example, the volume-average particle size of the rubber component may be selected from a range of about 0.1 to 10 μm, preferably about 0.2 to 7 μm, and particularly about 0.5 to 5 μm. Further, the particle size distribution of the rubber component may show a single peak or a plurality of peaks.

Among the styrenic resins, a polystyrene (PS resin), an AS resin, a HIPS resin, an ABS resin, an ASA resin, an AES resin, and an MBS resin are often used in practical cases. The molecular weight of the styrenic resin or the matrix of the rubber-reinforced styrenic resin (using gel-permeation chromatography, weight-average molecular weight in terms of polystyrene) is, for example, about $1 \times 10^4$ to $100 \times 10^4$, preferably about $5 \times 10^4$ to $50 \times 10^4$, and particularly about $10 \times 10^4$ to $50 \times 10^4$.

[Polyester-series Resin]

The polyester-series resin may be an aliphatic polyester-series resin, and from the viewing of heat resistance or other properties, it is advantageous to use an aromatic polyester-series resin. The aliphatic polyester-series resin includes, for example, a polymer of a hydroxycarboxylic acid [a homo- or copolymer of a hydroxy$C_{2-6}$alkanecarboxylic acid, such as a polylactic acid and a copolyester of lactic acid and glycolic acid], a polyester of an alkylene glycol and an aliphatic dicarboxylic acid [e.g., a polyester of a $C_{2-10}$alkylene glycol or a (poly)oxy$C_{2-4}$alkylene glycol and a $C_{2-12}$alkanedicarboxylic acid, such as a poly(ethylene glycol malonate), a poly(ethylene glycol succinate) and a poly(ethylene glycol adipate)], and a polyester of the above component and a lactone (e.g., a $C_{4-10}$lactone such as ε-caprolactone). The aliphatic polyester may be a biodegradable polyester.

The aromatic polyester-series resin may be obtained by a condensation reaction of an aromatic dicarboxylic acid or a reactive derivative thereof and a diol. Examples of the aromatic dicarboxylic acid include a benzenedicarboxylic acid (e.g., terephthalic acid, isophthalic acid, and orthophthalic acid), a naphthalenedicarboxylic acid (e.g., 1,5-naphthalenedicarboxylic acid, 2,6-naphthalenedicarboxylic acid), an anthracenedicarboxylic acid, 4,4'-diphenyldicarboxylic acid, 4,4'-biphenyl etherdicarboxylic acid, 4,4'-biphenylsulfonedicarboxylic acid, and a bis(carboxyphenyl) alkane [e.g., 4,4'-diphenylmethanedicarboxylic acid, and 2,2-bis(4-carboxyphenyl)propane]. These dicarboxylic acids may be used singly or in combination. The preferred aromatic dicarboxylic acid includes terephthalic acid, and 2,6-naphthalenedicarboxylic acid. Incidentally, if necessary, the aromatic dicarboxylic acid may be used in combination with an aliphatic dicarboxylic acid (a $C_{4-16}$alkanedicarboxylic acid such as adipic acid, azelaic acid, sebacic acid, and dodecanoic diacid), or an alicyclic dicarboxylic acid (e.g., cyclohexanedicarboxylic acid).

Examples of the diol include an alkylene glycol (e.g., a $C_{2-12}$alkylene glycol such as ethylene glycol, trimethylene glycol, propylene glycol, 1,3-butanediol, tetramethylene glycol, hexanediol, neopentyl glycol, and hexamethylene glycol), an oxy$C_{2-4}$alkylene glycol (e.g., diethylene glycol, dipropylene glycol, and triethylene glycol), an alicyclic diol (e.g., 1,4-cyclohexanedimethanol, and a hydrogenated product of an alkylene oxide adduct of a bisphenol), and an aromatic diol (e.g., an alkylene oxide adduct of a bisphenol, such as 2,2-bis(4-hydroxyethoxyphenyl)propane). These diols may be used singly or in combination. The preferred diol includes an alkylene glycol (e.g., a $C_{2-6}$alkylene glycol such as ethylene glycol, propylene glycol, trimethylene glycol, and tetramethylene glycol), and an aromatic diol. Incidentally, if necessary, a polyoxy$C_{2-4}$alkylene glycol (e.g., a polyethylene glycol, a polypropylene glycol, a polytetramethylene ether glycol), and others may be used in combination with the aromatic diol.

Further, as the component of the aromatic polyester-series resin, an aromatic hydroxycarboxylic acid, e.g., hydroxybenzoic acid, may be used.

Incidentally, in order to introduce a branched structure into the molecule of the resin, a branched agent, for example, a polycarboxylic acid (e.g., trimellitic acid, and trimesic acid), a polyol (e.g., trimethylolpropane, and pentaerythritol) may be used.

The aromatic polyester-series resin includes a polyalkylene arylate (homopolyester) such as a polyethylene terephthalate (PET), a polypropylene terephthalate, a polybutylene terephthalate (PBT), a polyethylene naphthalate (PEN), and a polybutylene naphthalate (PBN); a copolyester containing an alkylene arylate unit in a proportion of not less than 50% by weight (e.g., about 70 to 98% by weight) [for example, a polyalkylene arylate containing a copolymerizable component such as a $C_{4-16}$alkanedicarboxylic acid, isophthalic acid, and an $oxyC_{2-4}$alkylene glycol (e.g., an ethylene terephthalate-series copolyester, a polybutylene terephthalate-series copolyester, and a polybutylene naphthalate-series copolyester)]. Further, the aromatic polyester-series resin also includes a fully aromatic polyester-series resin [e.g., a polyarylate resin obtained by a reaction of an aromatic dicarboxylic acid (such as phthalic acid) with a bisphenol compound (such as bisphenol A)], and a liquid crystalline polyester. These aromatic polyester-series resins may be used singly or in combination.

The concentration of the terminal group in the polyester-series resin is not particularly limited to a specific one, and the terminal group (carboxyl group or hydroxyl group) may be blocked (or capped) with a blocking agent. The molecular weight of the aromatic polyester resin is not particularly limited to a specific one, and for example, the intrinsic viscosity (o-chlorophenol, 35° C.) is about 0.6 to 1.5, and preferably about 0.7 to 1.2.

[Polyamide-series Resin]

The polyamide-series resin includes, for example, a homopolyamide such as a polyamide 46, a polyamide 6, a polyamide 66, a polyamide 11, and a polyamide 12, a copolyamide such as a polyamide 6/10, a polyamide 6/11, a polyamide 6/12, a polyamide 66/11 and a polyamide 66/12, and others. The polyamide-series resin also includes an aromatic polyamide (e.g., MXD-6 which is obtained from a reaction of metaxylylenediamine with adipic acid). These polyamide-series resins may be used singly or in combination.

The preferred thermoplastic resin often comprises at least one member selected from the group consisting of a polycarbonate-series resin (an aromatic polycarbonate-series resin), a polyester-series resin (an aromatic polyester-series resin), a polyamide-series resin and a styrenic resin, in particular at least a polycarbonate-series resin (an aromatic polycarbonate-series resin). For example, the thermoplastic resin may comprise a polycarbonate-series resin, and at least one member selected from the group consisting of a styrenic resin (particularly, a non-rubber-reinforced styrenic resin, and a rubber-reinforced styrenic resin such as an ABS resin) and an aromatic polyester-series resin. The proportion of the polycarbonate-series resin relative to the other thermoplastic resin [the former/the latter] may be selected from a range of about 1/99 to 100/0 (weight ratio), and may be usually about 30/70 to 95/5 (weight ratio), preferably about 50/50 to 90/10 (weight ratio), and more preferably about 70/30 to 90/10 (weight ratio).

Incidentally, a composition containing a plurality of the thermoplastic resins may form a polymer blend or a polymer alloy. To such a system, if necessary, may be added a compatibilizing agent, e.g., an oxazoline compound, an epoxidized styrene-butadiene block copolymer, or a hydrogenated product thereof, and others.

[Wollastonite Fiber]

The wollastonite is a silicate mineral containing calcium, and has a fibrous form due to the crystal structure even in the case of pulverizing the wollastonite. Incidentally, the place of production of the wollastonite is not particularly limited to a specific one, and may be North America, Central and South America, and East Asia including China.

The number-average fiber length of the wollastonite fiber is, for example, not more than 50 μm, preferably not more than 30 μm (e.g., about 1 to 30 μm, particularly about 1 to 25 μm), more preferably not more than 20 μm (e.g., about 1 to 20 μm), and usually about 3 to 15 μm (e.g., about 5 to 10 μm)). Moreover, the number-average fiber diameter may for example be about 0.1 to 10 μm (e.g., about 0.1 to 7 μm, preferably about 0.5 to 7 μm, and more preferably about 1 to 5 μm). In the present invention, the wollastonite fiber effectively reinforces the resin composition even when the number-average fiber diameter is not less than 4 μm. The number-average fiber diameter may for example be about 4 to 10 μm, preferably about 4 to 7 μm (e.g., about 4.1 to 8 μm), and more preferably about 4.1 to 7 μm (e.g., about 4.30 to 6 μm), and may be usually about 4.2 to 5.5 μm.

The proportion of the number of a wollastonite fiber having a fiber length of 5 to 25 μm relative to the total number of the wollastonite fiber is not particularly limited to a specific one, and may for example be about 20 to 75% (preferably about 20 to 70%, and more preferably about 25 to 65%). In the present invention, the shaped article can be improved in the surface property and have an imparted high reinforcing property even when the proportion of the number is not more than 50% (e.g., about 25 to 45%), and preferably about 30 to 45% (e.g., about 35 to 45%).

As described above, according to the present invention, even in using a wollastonite fiber which has a number-average fiber length of not more than 20 μm and a number-average fiber diameter of not less than 4 μm, and in which the proportion of the number of a wollastonite fiber having a fiber length of 5 to 25 μm is less than 50%, not only high impact resistance and high weld strength, but also high surface property of the shaped article can be realized.

Further, the aspect ratio (average fiber length/average fiber diameter) of the wollastonite fiber is about 1.5 to 50 (e.g., about 1.5 to 30, preferably 1.5 to 20, more preferably about 1.5 to 10, and particularly about 1.5 to 5). In the present invention, even when the aspect ratio is small, high impact resistance can be imparted to the resin composition. The aspect ratio may be about 1.5 to 3, particularly less than 3 (e.g., about 1.5 to 2.8), preferably about 1.5 to 2.7, and more preferably about 1.5 to 2.5 (e.g., about 1.5 to 2.3).

The whiteness (or whiteness degree) of the wollastonite fiber is, for example, not less than 85, preferably about 89 to 96, and more preferably about 90 to 96. The oil absorption (linseed oil (ml)/100 g) of the wollastonite fiber may be about 25 to 78 (e.g., about 30 to 80, preferably about 40 to 80, and more preferably about 50 to 75).

Further, the pH of the wollastonite fiber is usually about 9.5 to 10.6 (e.g., about 9.7 to 10.6), and the ignition loss of the wollastonite fiber is usually about 0.7 to 3% by weight (e.g., about 0.7 to 2.5% by weight, preferably about 0.7 to 2% by weight, and more preferably about 0.7 to 1.8% by weight), preferably not more than 1.5% by weight, and particularly not more than 1.2% by weight. The ignition loss can be determined by removing water from a sample by heating, heating the sample at a rate of 10° C./minutes with TGA (Thermogravimetric Analysis), and measuring the loss of weight in the sample at 1300° C.

The fiber length and the fiber diameter can be measured as follows.

Fiber length: each wollastonite fiber is observed by an optical microscope (in which the magnifying power of the objective lens is 20), each length is measured, and from the measured value, the number-average fiber length, and the proportion of the number of the fiber having a fiber length of 5 to 25 μm are calculated. For the observation by the optical microscope, the sample may be prepared in a dispersed form by putting the sample in a mixed solution containing a purified water and a dispersing agent so that the wollastonite fibers don't overlap each other too much.

The observed image is imported as an image data to a CCD camera having a pixel size of about 290,000, and from thus obtained image data, the fiber length is calculated with an image analysis apparatus using a program for determining the absolute maximum length of the image data about the fibers not less than 5000.

Fiber diameter: each wollastonite fiber is observed by a scanning electron microscope, each fiber diameter is measured, and from the measured values, the number-average fiber diameter is calculated. The sample is used in absolute dry condition, and after treating with Pt sputtering, the sample picture of the scanning electron microscope is taken at a magnifying power of 1000. The fiber diameter is measured about 1000 fibers by using a scale as the index.

The wollastonite fiber may be obtained by pulverizing the wollastonite with a pulverizer (e.g., a jet mill) and classifying the resultant. Moreover, if necessary, the wollastonite fiber may be purified (e.g., treated for removing impurities, iron oxide, calcium oxide, aluminum oxide, and others).

If necessary, the wollastonite fiber may be subjected to surface treatment with a surface-treating agent, for example, a coupling agent such as a silane-series coupling agent (e.g., an alkoxysilane such as a glycidylalkoxysilane, an alkylalkoxysilane, and an aminoalkylalkoxysilane), and a titanate-series coupling agent, and others.

[Acid- or Epoxy-modified Olefinic Resin]

The present invention is characterized by adding a modified polyolefinic resin with a high molecular weight and a high melting point to a resin composition comprising a thermoplastic resin and a wollastonite fiber. As the olefinic resin, a homo- or copolymer of an α-olefin such as ethylene, propylene, butene, and methylpentene-1 may be utilized. Such an olefinic resin includes, for example, an ethylene-series resin (e.g., a polyethylene, an ethylene-propylene copolymer, and an ethylene-butene copolymer), a propylene-series resin (e.g., a polypropylene, a propylene-ethylene random copolymer, a propylene-ethylene block copolymer and a propylene-butene copolymer), and others. As the olefinic resin, a propylene-series resin containing at least a propylene is preferred.

The modified olefinic resin may be obtained by a copolymerization of the α-olefin and a modifying agent, a graft of a modifying agent relative to the olefinic resin, and others. Examples of the modifying agent include a monomer having a carboxyl group or an acid anhydride group [e.g., (meth) acrylic acid, crotonic acid, maleic acid, maleic anhydride, and fumaric acid], and a monomer having a glycidyl group or an epoxy group [e.g., glycidyl (meth) acrylate]. These monomers may be also used singly or in combination. As the modifying agent, (meth)acrylic acid, and maleic anhydride are usually employed in practical cases.

The weight-average molecular weight of the modified olefinic resin (using gel-permeation chromatography, in terms of polystyrene) is, for example, about $1.0 \times 10^4$ to $40 \times 10^4$ (e.g., about $2.0 \times 10^4$ to $35 \times 10^4$), usually about $2.5 \times 10^4$ to $30 \times 10^4$ (e.g., about $2.5 \times 10^4$ to $25 \times 10^4$), preferably about $2.5 \times 10^4$ to $23 \times 10^4$ (e.g., about $2.5 \times 10^4$ to $20 \times 10^4$), and more preferably about $2.7 \times 10^4$ to $20 \times 10^4$ (e.g., about $5 \times 10^4$ to $17 \times 10^4$), and may be usually about $3 \times 10^4$ to $16 \times 10^4$. Incidentally, the number-average molecular weight may for example be about $0.5 \times 10^4$ to $10 \times 10^4$ (e.g., about $0.75 \times 10^4$ to $10 \times 10^4$), and preperably about $0.8 \times 10^4$ to $7.5 \times 10^4$ (e.g., about $0.8 \times 10^4$ to $5 \times 10^4$). The number-average molecular weight is usually not less than $1 \times 10^4$, e.g., about $1 \times 10^4$ to $7 \times 10^4$ (e.g., about $1 \times 10^4$ to $6 \times 10^4$), preferably about $1.5 \times 10^4$ to $7 \times 10^4$ (e.g., about $1.5 \times 10^4$ to $4 \times 10^4$), and more preferably about $1.7 \times 10^4$ to $5 \times 10^4$ (e.g., about $2 \times 10^4$ to $5 \times 10^4$).

The modified olefinic resin used in the present invention is characterized by a high melting point. The melting point of the modified olefinic resin may be selected from a range of about 100 to 170° C., and may be usually about 120 to 170° C. (e.g., about 125 to 165° C.), preferably about 130 to 165° C. (e.g., about 135 to 165° C.), and about 140 to 165° C.

The amount of the acid group or the epoxy group to be introduced (or modified amount) may for example be about 0.1 to 10% by weight (about 0.5 to 10% by weight), preferably about 1 to 10% by weight, and more preferably about 1 to 5% by weight. Further, the saponification value of the modified olefinic resin (KOHmg/g) is about 10 to 80, preferably about 10 to 70 (e.g., about 20 to 70), and more preferably about 10 to 60 (e.g., about 20 to 60).

Such a polymeric modified olefinic resin (modifying agent) largely improves the resin composition comprising the thermoplastic resin and the wollastonite fiber, and imparts high surface property (or surface smoothness) and heat resistance to the shaped article independently of the kind of the wollastonite fiber, and additionally improves impact resistance and weld strength.

[Proportion of Each Component]

The proportion (weight ratio) of the wollastonite fiber relative to the modified olefinic resin [the former/the latter] may for example be about 99.5/0.5 to 50/50, preferably about 99/1 to 60/40, and more preferably about 95/5 to 75/25 (e.g., about 93/7 to 85/15).

Further, the proportion of the wollastonite fiber may be selected from a range of about 1 to 100 parts by weight relative to 100 parts by weight of the thermoplastic resin, and may be usually about 1 to 60 parts by weight (e.g., about 1 to 50 parts by weight), preferably about 3 to 55 parts by weight (e.g., about 5 to 50 parts by weight), more preferably about 5 to 40 parts by weight (e.g., about 5 to 30 parts by weight), and 10 to 30 parts by weight, relative to 100 parts by weight of the thermoplastic resin. Moreover, the modified olefinic resin has high improving effects even at a small amount. Therefore, the amount of the modified olefinic resin may be selected from a range of about 0.1 to 20 parts by weight (e.g., about 0.1 to 10 parts by weight) relative to 100 parts by weight of the thermoplastic resin, and is preferably about 0.1 to 5 parts by weight (e.g., about 0.2 to 5 parts by weight), and more preferably about 0.5 to 5 parts by weight, relative to 100 parts by weight of the thermoplastic resin.

[Flame Retardant]

The resin composition of the present invention may comprise a flame retardant. The kind of the flame retardant is not particularly limited to a specific one, and includes a halogen-containing flame retardant (e.g., a brominated bisphenol-based epoxy resin, a brominated phenoxyresin, a brominated polystyrenic resin, a brominated polyphenylene ether-series flame retardant, and a halogenated bisphenol-based polycarbonate-series flame retardant), a metal salt-series flame retardant (a metal salt of an organic acid) [e.g., a metal salt (such as an alkali metal (Na, K) salt or an alkaline earth metal salt) of an organic carboxylic acid or organic sulfonic acid, such as a metal salt of a perfluoroalkanesulfonic acid, a metal salt of a trihalobenzenesulfonic acid, a metal salt of a diphenylsulfone-disulfonic acid, and a metal salt of a diphenylsulfonesulfonic acid], a phosphorus-containing flame retardant, a silicone-series flame retardant, a phosphazene-series flame retardant, a metal oxide (e.g., antimony oxide), and others. These flame retardants may be used singly or in combination.

The halogenated bisphenol-based polycarbonate-series flame retardant among the halogen-containing flame retardants includes, for example, a polycarbonate-based flame retardant containing tetrachlorobisphenol A as a base (e.g., a homopolycarbonate resin of tetrachlorobisphenol A, a copolycarbonate resin obtained from a copolymerization of tetrachlorobisphenol A and bisphenol A).

The phosphorus-containing flame retardant includes an aromatic phosphoric ester-series flame retardant, a red phosphorus-series flame retardant (e.g., a red phosphorus, a stabilized red phosphorus obtained by coating a surface of a red phosphorus with a thermosetting resin and/or an inorganic compound), and others.

Examples of the aromatic phosphoric ester-series flame retardant include triphenyl phosphate, cresyldiphenyl phosphate, tris(tolyl) phosphate, tris(xylenyl) phosphate, resorcinolbis(diphenyl phosphate), hydroquinonebis(diphenyl phosphate), resorcinolbis(dixylenyl phosphate), hydroquinonebis(dixylenyl phosphate), 4,4'-biphenolbis(diphenyl phosphate), 4,4'-biphenolbis(dixylenyl phosphate), a bis(diphenyl phosphate) of a bisphenol compound (e.g., bisphenol A), and a bis(dixylenyl phosphate) of a bisphenol compound (e.g., bisphenol A). The aromatic phosphoric ester-series flame retardant also includes a halogenated aromatic phosphoric ester-series flame retardant. As the halogenated aromatic phosphoric ester-series flame retardant, there may be mentioned a halogenated product of the aromatic phosphoric ester-series flame retardant (for example, tris(4-bromophenyl) phosphate, tris(2,4-dibromophenyl) phosphate, and tris (2,4,6-tribromophenyl) phosphate), a phenol-condensed product of 2,2-bis(p-hydroxyphenyl)propane-trichlorophosphine oxide oxide polycondensation product (polymerization degree of 1 to 3) ("ADKSTAB FP-700", "ADKSTAB FP-750" manufactured by Asahi Denka Kogyo K.K.).

The preferred flame retardant includes a phosphorus-containing flame retardant (e.g., an aromatic phosphoric ester-series flame retardant).

The flame retardant may be used in combination with a flame-retardant auxiliary. For example, the flame-retardant auxiliary may comprise a dripping inhibitor or a fluorine-containing resin. The flame-retardant auxiliary may be usually employed in the form of a particulate. The fluorine-containing resin includes, for example, a polytetrafluoroethylene, a polychlorotrifluoroethylene, a polyvinylidene fluoride, and a tetrafluoroethylene-hexafluoropropylene copolymer. The preferred fluororesin includes a polytetrafluoroethylene, in particular a polytetrafluoroethylene being capable of fibrillation.

The amount of the flame retardant is, for example, about 0.5 to 30 parts by weight, preferably about 1 to 25 parts by weight (e.g., about 5 to 25 parts by weight), and more preferably about 5 to 20 parts by weight, relative to 100 parts by weight of the thermoplastic resin.

The amount of the flame-retardant auxiliary is, for example, about 0.1 to 5 parts by weight, preferably about 0.3 to 3 parts by weight (e.g., about 0.5 to 3 parts by weight), an more preferably 0.5 to 2 parts by weight, relative to 100 parts by weight of the thermoplastic resin.

The resin composition of the present invention may further comprise various additives, for example, a filler, a stabilizer (e.g., a heat stabilizer, an antioxidant, and an ultraviolet ray absorbing agent), a mold-release agent (releasing agent), an antistatic agent, and a coloring agent. The filler includes an inorganic filler [for example, a fibrous filler (e.g., a glass fiber, a carbon fiber, a metal fiber, and a whisker (e.g., potassium titanate, aluminum borate)), a plate-like filler (e.g., a talc, a mica, and a glass flake), a particulate filler (a glass bead, a silica, an alumina, a titania, calcium carbonate, and titanium oxide)], and an organic filler [for example, a fibrous filler (an aramid fiber), a particulate filler (e.g., a phenol resin particle, a crosslinked styrenic resin particle, and a crosslinked acrylic resin particle)].

The heat stabilizer includes, for example, phosphorous acid, phosphoric acid, phosphonous acid, phosphonic acid, or an ester thereof. Examples of the heat stabilizer include a phosphorous ester (a triaryl phosphite such as triphenyl phosphite and trisnonylphenyl phosphate; a $triC_{1-20}alkyl$ phosphite such as tris(2,4-di-t-butylphenyl) phosphite and tridecyl phosphate; a $diC_{4-20}alkylaryl$ phosphate; a $monoC_{4-20}alkylaryl$ phosphite; an alkylenebis(t-alkylphenyl)alkyl phosphite such as 2,2-methylenebis(4,6-di-t-butylphenyl) octyl phosphate; a dialkylpentaerythritol diphosphite such as distearylpentaerythritol diphosphite; a bis(t-butylphenyl) pentaerythritol diphosphite such as bis(2,4-di-t-butylphenyl) pentaerythritol diphosphite, bis(2,6-di-t-butyl-4-methylphenyl)pentaerythritol diphosphite, and bis(nonylphenyl) pentaerythritol diphosphite), a phosphoric ester (e.g., a $triC_{1-20}alkyl$ phosphate; a triaryl phosphate such as triphenyl phosphate, and tricresyl phosphate; and a $diC_{3-20}alkyl$ phosphate), an ester of phosphonous acid (e.g., tetrakis(2,4-di-t-butylphenyl)-4,4'-biphenylene diphosphonite, and bis(2,4-di-t-butylphenyl)-4-biphenylene phosphonite). These heat stabilizers may be used singly or in combination.

The amount of the heat stabilizer may be about 0.01 to 1 part by weight, preferably about 0.05 to 0.7 part by weight, and more preferably about 0.1 to 0.5 part by weight, relative to 100 parts by weight of the thermoplastic resin.

As the antioxidant, a conventional antioxidant, e.g., a hindered phenol-series, a hindered amine-series, and a phosphorus-containing antioxidant may be utilized. The amount of the antioxidant may be about 0.001 to 1 part by weight relative to 100 parts by weight of the thermoplastic resin. As the ultraviolet ray absorbing agent, a conventional ultraviolet ray absorbing agent may be used, for example, a benzophenone-series ultraviolet ray absorbing agent, a benzotriazole-series ultraviolet ray absorbing agent, and a triazine-series ultraviolet ray absorbing agent. Further, a light stabilizer such as a hindered amine-series light stabilizer may be also employed. The amount of the ultraviolet ray absorbing agent or the light stabilizer may be about 0.01 to 5 parts by weight relative to 100 parts by weight of the thermoplastic resin. Example of the mold-release agent includes a wax (e.g., a polyethylene wax, an ester of a higher fatty acid, and an amide of an aliphatic acid), and a silicone oil. The amount of the mold-release agent may be about 0.01 to 2 parts by weight relative to 100 parts by weight of the thermoplastic resin.

The thermoplastic resin composition of the present invention may be prepared by a conventional method, for example, a method which comprises pre-mixing each component with the use of a blender (e.g., a tumbler, a V-shaped blender, a Henschel mixer, a nauta mixer, a ribbon mixer, a mechanochemical apparatus, and an extrusion blender), melt-kneading the mixture by a melt-kneader (e.g., a uniaxial or a vented biaxial extruder), and pelletizing the kneaded product by a pelletizing means (e.g., a pelletizer); a method which comprises preparing a master batch of a desired component, melt-kneading the master batch and a resin composition by a melt-kneader, after mixing with other component(s) if necessary, to pelletize the kneaded product; a method which comprises melt-kneading together each component by feeding the components to a melt-kneader, and pelletizing the kneaded product; a method which comprises adding a given component (e.g., the modified olefinic resin) to the middle part of a melt-kneader for mixing other component(s), and kneading the mixed components; and others.

The thermoplastic resin composition of the present invention not only has a high heat stability, flowability and formability, but also significantly improves in weld strength and surface property with maintaining a high rigidity, heat resistance and impact resistance. Therefore, the thermoplastic resin composition is useful for obtaining various resinous shaped articles. The resinous shaped articles may be easily formed by a conventional manner, e.g., by molding (or shaping) the pellet. The molding method is not particularly limited to a specific one, and may include an injection molding, an extrusion molding, a blow molding, a press molding, an insert molding, a two-color (or double) molding, and others. Even when the resin composition is subjected to an injection molding which tends to cause weld line due to the confluence of a molten resin composition (an injection molding in which a molten resin composition is injected from a plurality of gates into a metal mold) among these molding methods, the obtained shaped article has a high strength (rigidity), impact resistance, weld strength, and surface property (appearance property such as surface smoothness).

The resin composition of the present invention can be suited for various applications for example, interior or exterior parts for vehicles, housing members of precision instruments [e.g., a digital camera, and a personal digital assistance (or hand-held terminal)], housing members of office automation (OA) instruments (e.g., a personal computer, a printer, a copying machine, and a facsimile), and others.

EXAMPLES

The following examples are intended to describe this invention in further detail and should by no means be interpreted as defining the scope of the invention.

Incidentally, in Examples and Comparative Examples, properties (or performances) of shaped articles were evaluated as follows.

Impact strength (Charpy impact strength, $kJ/m^2$): In accordance with ISO 179, the impact strength was measured by using a test piece of 4 mm thick under an atmosphere of 23° C.

Rigidity (MPa): The bending (or flexural) test was carried out based on ISO 178, and the flexural modulus (FM) was measured.

Flame retardancy: In accordance with UL 94V, the vertical combustion test was conducted by using a test piece 1.5 mm thick, and the rank of the flammability was evaluated.

Melt flow rate (MFR, g/10 minutes): Based on ISO 1133, the melt flow rate was measured under a temperature of 240° C. and a load of 5 kg.

Heat distortion temperature (HDT, ° C.): The heat distortion temperature was measured based on ISO 75.

Weld strength: By using a standard strip piece of 3 mm thick (1/8 inch), and a strip test piece of 3 mm thick welded in the central part of the longitudinal direction, the flexural strength was measured in accordance with ISO 178. Then, the proportion of the flexural strength of the strip test piece relative to that of the standard strip piece was calculated as a weld retention.

Examples 1 to 15 and Comparative Examples 1 to 5

Each component was mixed at each proportion shown in Tables 1 to 3 by a V-shaped blender, and kneaded and pelletized at a cylinder temperature of 260° C. by a vented biaxial extruder with a screw diameter of 30 mm ["Biaxial Extruder TEX30α" manufactured by The Japan Steel Works, LTD.]. Thus obtained pellet was subjected to an injection molding at a cylinder temperature of 250° C. and a mold temperature of 60° C. by using an injection molding machine ["SH100" manufactured by Sumitomo Heavy Industries, Ltd.] to form a test piece. Incidentally, in Examples and Comparative Examples, the following components were used.

PC: a commercially available aromatic polycarbonate resin (bisphenol A-based polycarbonate resin) having a viscosity-average molecular weight of 25,000

ABS: ABS resin (rubber content: 20% by weight, acrylonitrile content: 20% by weight)

Wollastonite fiber:
w1: number-average fiber length=2 μm, number-average fiber diameter=1.1 μm, proportion of the number of a wollastonite having a fiber length of 5 to 25 μm relative to the total number=25%, aspect ratio=1.8
w2: number-average fiber length=8.9 μm, number-average fiber diameter=4.5 μm, proportion of the number of a wollastonite having a fiber length of 5 to 25 μm relative to the total number=38%, aspect ratio=2
w3: number-average fiber length=8.2 μm, number-average fiber diameter=5.2 μm, proportion of the number of a wollastonite having a fiber length of 5 to 25 μm relative to the total number=40%, aspect ratio=2
w4: number-average fiber length=22 μm, number-average fiber diameter=7 μm, proportion of the number of a wollastonite having a fiber length of 5 to 25 μm relative to the total number=62%, aspect ratio=3.1

Modified olefinic resin:
MO1: an acid-modified polypropylene resin (weight-average molecular weight=$3 \times 10^4$, number-average molecular weight=$1.5 \times 10^4$, melting point=145° C., amount of the modifying maleic anhydride=10% by weight) ("YOUMEX 1010" manufactured by Sanyo Chemical Industries, Ltd.)
MO2: an acid-modified polypropylene resin (weight-average molecular weight=$15 \times 10^4$, number-average molecular weight=$3.5 \times 10^4$, melting point=158° C., amount of the modifying maleic anhydride=1% by weight)
MO3: an acid-modified polypropylene resin (weight-average molecular weight=$16 \times 10^4$, number-average molecular weight=$4 \times 10^4$, melting point=161° C., amount of the modifying maleic anhydride=1% by weight)("CA100" manufactured by Atofina)
MO4: an acid-modified polypropylene resin (weight-average molecular weight=$10 \times 10^4$, number-average molecular weight=$3 \times 10^4$, melting point=152° C., amount of the modifying maleic anhydride=1% by weight)
MO5: an acid-modified polyethylene resin (weight-average molecular weight=$6 \times 10^4$, number-average molecular weight=$2 \times 10^4$, melting point=74 to 76° C., amount of the modifying maleic anhydride=2% by weight)
MO6: an acid-modified polypropylene wax (weight-average molecular weight=$0.7 \times 10^4$, number-average molecular weight=$0.25 \times 10^4$, melting point=70° C., amount of the modifying maleic anhydride=5% by weight) ("9A" manufactured by AlliedSignal Inc.)
MO7: an acid-modified polyethylene wax (weight-average molecular weight=$0.8 \times 10^4$, number-average molecular weight=$0.3 \times 10^4$, melting point=72 to 76° C., amount of the modifying maleic anhydride=2% by weight) ("Diacarna 30" manufactured by Mitsubishi Chemical Corporation)

Flame retardant: FR: resorcinol bis (dixylenyl phosphate) ("ADKSTAB FP-500" manufactured by Asahi Denka Kogyo K.K.)

Flame-retardant auxiliary: PTFE: a polytetrafluoroethylene being capable of fibrillation ("6J" manufactured by Du Pont-Mitsui Fluorochemicals Company, Ltd.)
Heat stabilizer: a phosphorus-containing stabilizer (tris(2,4-di-t-butylphenyl) phosphite ("IRGAFOS 168" manufactured by Ciba-Geigy Corporation))
The results are shown in Tables 1 to 3.

TABLE 1

|  | Comparative Examples | | Examples | | | |
| --- | --- | --- | --- | --- | --- | --- |
|  | 1 | 2 | 1 | 2 | 3 | 4 |
| PC | 80 | 80 | 80 | 80 | 80 | 80 |
| ABS | 20 | 20 | 20 | 20 | 20 | 20 |
| Wollastonite fiber w2 | — | 21 | 21 | 21 | 21 | 21 |
| Modified olefinic resin MO2 | — | — | 0.3 | 2 | 5 | 8 |
| Flame retardant | 16 | 16 | 16 | 16 | 16 | 16 |
| Flame-retardant auxiliary | 1 | 1 | 1 | 1 | 1 | 1 |
| Heat stabilizer | 0.2 | 0.2 | 0.2 | 0.2 | 0.2 | 0.2 |
| Flexural strength (MPa) | 96 | 105 | 104 | 100 | 100 | 100 |
| Flexural modulus (MPa) | 3000 | 4800 | 4700 | 4700 | 4600 | 4400 |
| HDT (° C.) | 86 | 91 | 91 | 90 | 90 | 89 |
| Impact strength (kJ/m$^2$) | 10 | 3 | 8 | 12 | 16 | 18 |
| MFR (g/10 min.) | 10 | 17 | 19 | 22 | 27 | 35 |
| Flame retardancy (1.5 mm) | V-0 | V-0 | V-0 | V-0 | V-0 | V-0 |
| Weld retention (3 mm) | 70% | 60% | 82% | 84% | 84% | 84% |

As apparent from Table 1, addition of the modified olefinic resin ensures great improvement of the resin composition in impact resistance, flowability and weld strength with maintaining heat resistance.

TABLE 2

|  | Examples | | | | Comparative Examples | | |
| --- | --- | --- | --- | --- | --- | --- | --- |
|  | 5 | 6 | 7 | 8 | 3 | 4 | 5 |
| PC | 80 | 80 | 80 | 80 | 80 | 80 | 80 |
| ABS | 20 | 20 | 20 | 20 | 20 | 20 | 20 |
| Wollastonite fiber w2 | 21 | 21 | 21 | 21 | 21 | 21 | 21 |
| Modified olefinic resin MO1 | 2 |  |  |  |  |  |  |
| Modified olefinic resin MO2 |  | 2 |  |  |  |  |  |
| Modified olefinic resin MO3 |  |  | 2 |  |  |  |  |
| Modified olefinic resin MO4 |  |  |  | 2 |  |  |  |
| Modified olefinic wax MO5 |  |  |  |  | 2 |  |  |
| Modified olefinic wax MO6 |  |  |  |  |  | 2 |  |
| Modified olefinic wax MO7 |  |  |  |  |  |  | 2 |
| Flame retardant | 16 | 16 | 16 | 16 | 16 | 16 | 16 |
| Flame-retardant auxiliary | 1 | 1 | 1 | 1 | 1 | 1 | 1 |
| Heat stabilizer | 0.2 | 0.2 | 0.2 | 0.2 | 0.2 | 0.2 | 0.2 |
| Flexural strength (MPa) | 100 | 100 | 100 | 100 | 96 | 100 | 90 |
| Flexural modulus (MPa) | 4500 | 4700 | 4700 | 4400 | 4600 | 4500 | 4200 |
| HDT (° C.) | 89 | 90 | 90 | 87 | 85 | 90 | 83 |
| Impact strength (kJ/m$^2$) | 13 | 12 | 11 | 13 | 9 | 3 | 12 |
| MFR (g/10 min.) | 24 | 22 | 20 | 25 | 20 | 22 | 23 |
| Flame retardancy (1.5 mm) | V-0 | V-0 | V-0 | V-0 | V-0 | V-0 | V-0 |
| Weld retention (3 mm) | 85% | 84% | 85% | 83% | 70% | 70% | 75% |

As apparent from Table 2, the modified olefinic resin can greatly improve strength, heat resistance, impact resistance and weld strength compared with the modified wax.

TABLE 3

| | Examples | | | | | | |
|---|---|---|---|---|---|---|---|
| | 9 | 10 | 11 | 12 | 13 | 14 | 15 |
| PC | 80 | 80 | 80 | 80 | 80 | 80 | 80 |
| ABS | 20 | 20 | 20 | 20 | 20 | 20 | 20 |
| Wollastonite fiber w1 | 21 | | | | | | |
| Wollastonite fiber w2 | | 21 | | | 6 | 21 | 51 |
| Wollastonite fiber w3 | | | 21 | | | | |
| Wollastonite fiber w4 | | | | 21 | | | |
| Modified olefinic resin MO2 | 2 | 2 | 2 | 2 | 2 | 2 | 2 |
| Flame retardant | 16 | 16 | 16 | 16 | 16 | 16 | 16 |
| Flame-retardant auxiliary | 1 | 1 | 1 | 1 | 1 | 1 | 1 |
| Heat stabilizer | 0.2 | 0.2 | 0.2 | 0.2 | 0.2 | 0.2 | 0.2 |
| Flexural strength (MPa) | 100 | 100 | 100 | 95 | 95 | 100 | 100 |
| Flexural modulus (MPa) | 4500 | 4700 | 4700 | 4200 | 3000 | 4500 | 7300 |
| HDT (° C.) | 90 | 90 | 90 | 90 | 90 | 90 | 90 |
| Impact strength (kJ/m$^2$) | 8 | 12 | 12 | 12 | 18 | 12 | 5 |
| MFR (g/10 min.) | 24 | 22 | 22 | 20 | 27 | 24 | 20 |
| Flame retardancy (1.5 mm) | V-0 | V-0 | V-0 | V-0 | V-0 | V-0 | V-0 |
| Weld retention (3 mm) | 55% | 84% | 86% | 78% | 85% | 84% | 70% |

As apparent from Table 3, even where the wollastonite fiber with a large fiber diameter and a small aspect ratio is used, a high-performance shaped article can be obtained. Even in the case of using a large amount of the wollastonite fiber, a high-performance shaped article can be obtained without deteriorating in flowability.

What is claimed is:

1. A resin composition comprising a thermoplastic resin, a wollastonite fiber, and an acid-modified olefinic resin, wherein
    the wollastonite fiber has a number-average fiber diameter of 4 to 10 μm and an average aspect ratio of 1.5 to 5, and
    the acid-modified olefinic resin comprises a maleic anhydride-modified propylene-resin having a number-average molecular weight of $1 \times 10^4$ to $7 \times 10^4$ and a melting point of 120 to 170° C.

2. A resin composition according to claim 1, wherein the thermoplastic resin comprises at least one member selected from the group consisting of a polycarbonate-resin, a polyester-resin, a polyamide-resin, and a styrenic resin.

3. A resin composition according to claim 1, wherein the wollastonite fiber has a number-average fiber length of 1 to 30 μm and a number-average fiber diameter of 4.1 to 7 μm, and the proportion of the number of a wollastonite fiber having a fiber length of 5 to 25 μm relative to the total number of the wollastonite fiber is 20 to 75%.

4. A resin composition according to claim 1, wherein the wollastonite fiber has a number-average fiber diameter of 4.3 to 6 μm and an average aspect ratio of 1.5 to 3.

5. A resin composition according to claim 1, wherein the melting point of the maleic anhydride-modified propylene-resin is 125 to 165° C.

6. A resin composition according to claim 5, wherein the number-average molecular weight of the maleic anhydride-modified propylene-resin is $1.5 \times 10^4$ to $7 \times 10^4$.

7. A resin composition according to claim 1, which comprises 1 to 60 parts by weight of the wollastonite fiber, and 0.1 to 20 parts by weight of the maleic anhydride-modified propylene-resin having a number-average molecular weight of $1 \times 10^4$ to $7 \times 10^4$ and a melting point of 120 to 170° C., relative to 100 parts by weight of the thermoplastic resin, wherein the ratio of the wollastonite fiber relative to the maleic anhydride-modified propylene-resin is 99.5/0.5 to 50/50 (weight ratio).

8. A resin composition according to claim 7, wherein the wollastonite fiber has a number-average fiber diameter of 4.1 to 8 μm and an average aspect ratio of 1.5 to 2.8, and the proportion of the number of a wollastonite fiber having a fiber length of 5 to 25 μm relative to the total number of the wollastonite fiber is not more than 50%.

9. A resin composition according to claim 1, which further comprises a flame retardant.

10. A resin composition according to claim 9, wherein the flame retardant comprises an aromatic phosphoric ester flame retardant, and a fluororesin.

11. A resin composition according to claim 1, wherein the thermoplastic resin comprises at least a polycarbonate-resin.

12. A resin composition according to claim 1, wherein the thermoplastic resin comprises a polycarbonate-resin, and at least one member selected from the group consisting of a styrenic resin, a rubber-reinforced styrenic resin and an aromatic polyester-resin, in a proportion of 1/99 to 100/0 (weight ratio).

13. A shaped article formed from a resin composition recited in claim 1.

14. A method for improving heat resistance and weld strength of a shaped article, which comprises molding a thermoplastic resin with a combination of a wollastonite fiber, and an acid-modified polyolefinic resin, wherein
    the wollastonite fiber has a number-average fiber diameter of 4 to 10 μm and an average aspect ratio of 1.5 to 5, and
    the acid-modified polyolefinic resin comprises a maleic anhydride-modified propylene-resin having a number-average molecular weight of $1 \times 10^4$ to $7 \times 10^4$ and a melting point of 120 to 170° C.

* * * * *